US011025142B2

(12) United States Patent
Zhu et al.

(10) Patent No.: US 11,025,142 B2
(45) Date of Patent: Jun. 1, 2021

(54) METHOD FOR MANUFACTURING ELECTRIC MACHINE

(71) Applicant: Ford Global Technologies, LLC, Dearborn, MI (US)

(72) Inventors: Leyi Zhu, Novi, MI (US); Michael W. Degner, Novi, MI (US); Feng Liang, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/123,321

(22) Filed: Sep. 6, 2018

(65) Prior Publication Data

US 2020/0083788 A1 Mar. 12, 2020

(51) Int. Cl.
| | |
|---|---|
| *H02K 15/02* | (2006.01) |
| *H02K 15/03* | (2006.01) |
| *B60L 50/51* | (2019.01) |
| *H02K 1/02* | (2006.01) |
| *H02K 1/27* | (2006.01) |
| *H02K 7/00* | (2006.01) |
| *H02K 15/12* | (2006.01) |
| *H02K 1/12* | (2006.01) |

(52) U.S. Cl.
CPC .............. *H02K 15/03* (2013.01); *B60L 50/51* (2019.02); *H02K 1/02* (2013.01); *H02K 1/12* (2013.01); *H02K 1/276* (2013.01); *H02K 7/006* (2013.01); *H02K 15/12* (2013.01); *Y10T 29/49012* (2015.01)

(58) Field of Classification Search
CPC .......... H02K 1/02; H02K 15/03; H02K 15/02; H02K 1/276; H02K 1/2766; H02K 15/00; Y10T 29/49012; Y10T 156/1057; Y10T 29/49009; Y10T 29/53143; B33Y 10/00
USPC .... 29/598, 596, 602.1, 603.13, 603.27, 607, 29/609, 732
See application file for complete search history.

(56) References Cited

U.S. PATENT DOCUMENTS

| 9,919,340 B2 | 3/2018 | Kreidler et al. |
| 10,355,537 B2 * | 7/2019 | Zhu ........................ H02K 15/03 |
| 2016/0099635 A1 | 4/2016 | Liang et al. |
| 2017/0154713 A1 | 6/2017 | Simon et al. |
| 2017/0264152 A1 | 9/2017 | Liang et al. |

FOREIGN PATENT DOCUMENTS

DE  102016119654 A1  4/2018

* cited by examiner

*Primary Examiner* — Thiem D Phan
(74) *Attorney, Agent, or Firm* — Brooks Kushman PC; David Kelley (57) ABSTRACT

A method of forming a rotor lamination includes, with a laser, fabricating a first region of a lamination layer with a first powdered metal having a first composition. The first region at least partially defines a magnet pocket. The method further includes, with a laser, fabricating a second region of the lamination layer with a second powdered metal having a second composition different than the first composition. The second region is disposed immediately adjacent the first region.

11 Claims, 7 Drawing Sheets

METHOD FOR MANUFACTURING ELECTRIC MACHINE

TECHNICAL FIELD

The present disclosure relates to an electric machine assembly of an electrified vehicle.

BACKGROUND

Extended drive range technology for electrified vehicles, such as battery electric vehicles (BEVs), hybrid electric vehicles (HEVs), and plug in hybrid vehicles (PHEVs), is continuously improving. Achieving these increased ranges, however, often requires traction batteries and electric machines to have higher power outputs and associated thermal management systems with increased capacities in comparison to previous BEVs and PHEVs. Improving efficiency between electric machine stator cores and rotors may increase power outputs of the electric machines.

SUMMARY

In at least one approach, a method of forming a rotor lamination is provided. The method may include, with a laser, fabricating a first region of a rotor lamination layer with a first powdered metal having a first composition. The method may further include, with a laser, fabricating a second region of the rotor lamination layer in contact with the first region with a second powdered metal having a second composition different than the first composition. The first and second regions may be fabricated in a common lamination plane.

In at least one approach, a rotor is provided. The rotor may include a rotor core lamination. The rotor core lamination may include a first metal alloy that at least partially defines adjacent magnet pockets proximate an outer periphery of the rotor core lamination. The rotor core lamination may further include a second metal alloy different than the first metal alloy that forms at least a portion of a bridge that extends between the magnet pockets. The rotor may further include permanent magnets disposed in the magnet pockets at opposing sides of the second metal alloy.

In at least one approach, an electric machine is provided. The electric machine may include a stack of interlocked rotor core laminations. Individual rotor core laminations of the interlocked rotor core laminations may include a mortise extending therein and an integrally-formed tenon extending therefrom. The tenons may interface with the mortises to interlock adjacent rotor core laminations. A first individual rotor core lamination may have a first mortise having a depth extending into the first individual rotor core lamination. A second individual rotor core lamination may have a first integrally-formed tenon having a height extending therefrom. The height of the first integrally-formed tenon may correspond to the depth of the first mortise.

In at least one approach, a method of forming a rotor lamination is provided. The method may include, with a laser, fabricating a first region of a lamination layer with a first powdered metal having a first composition. The first region may at least partially define a magnet pocket. The method may further include, with a laser, fabricating a second region of the lamination layer with a second powdered metal having a second composition different than the first composition. The second region may be disposed immediately adjacent the first region.

In at least one approach, a rotor is provided. The rotor includes a lamination containing a pair of permanent magnets that may be disposed in adjacent magnet pockets at an outer periphery of the lamination. The lamination may include a first metal alloy that at least partially defines a cavity disposed between at least portions of the magnet pockets. The lamination may include a second metal alloy different than the first metal alloy and that may form at least a portion of a bridge that extends between the magnet pockets.

In at least one approach, a rotor core is provided. The rotor core may include a stack of interlocked laminations. The interlocked laminations may include a first lamination, a second lamination, and a third lamination. The first lamination may have a first wedge extending therefrom. The second lamination may be secured to the first lamination and may have a first notch extending therein and a second wedge extending therefrom. The first wedge may be received within the first notch. The third lamination may be secured to the second lamination and may have a second notch extending therein. The second wedge may be received within the second notch.

In at least one approach, a method of forming a rotor core is provided. The method may include fabricating a first lamination having a first wedge, a second lamination having a first notch and a second wedge, and a third lamination having a second notch. The method may further include affixing the first lamination to the second lamination such that the first wedge is disposed within the first notch. The method may further include affixing the second lamination to the third lamination such that the second wedge is disposed within the second notch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
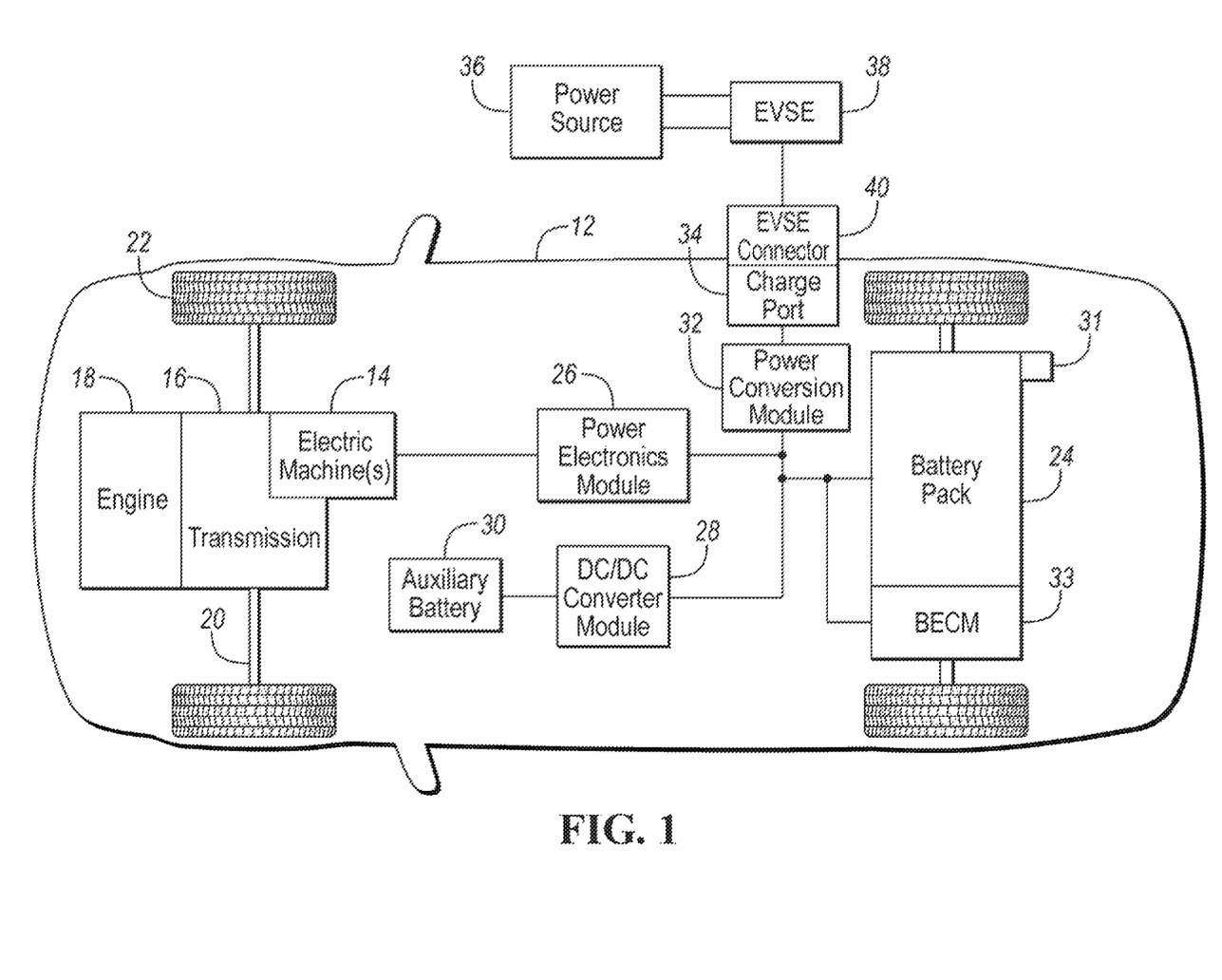
FIG. 1 is a schematic diagram illustrating an example of an electrified vehicle.

FIG. 1 is a schematic diagram illustrating an example of an electrified vehicle. In this example, the electrified vehicle is a PHEV referred to as a vehicle 12 herein. The vehicle 12 may include one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that may be mechanically connected to wheels 22. The electric machines 14 can provide propulsion and deceleration capability when the engine 18 is turned on or off. The electric machines 14 may also operate as generators and provide fuel economy benefits by recovering energy that would normally be lost as heat in the friction braking system. The electric machines 14 may also provide reduced pollutant emissions since the vehicle 12 may be operated in electric mode under certain conditions.

A traction battery 24 may store energy that can be used by the electric machines 14. The traction battery 24 may typically provide a high voltage DC output from one or more battery cell arrays, sometimes referred to as battery cell stacks, within the traction battery 24. The battery cell arrays may include one or more battery cells. The traction battery 24 may be electrically connected to one or more power electronics modules 26 through one or more contactors (not shown). The one or more contactors may isolate the traction battery 24 from other components when opened and connects the traction battery 24 to other components when closed. The power electronics module 26 may also be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a twelve-volt battery).

A battery electrical control module (BECM) 33 may be in communication with the traction battery 24. The BECM 33 may act as a controller for the traction battery 24 and may also include an electronic monitoring system that manages temperature and charge state of each battery cell of the traction battery 24. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36 such as an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The charge connector 40 may have pins that mate with corresponding recesses of the charge port 34.

The various components discussed above may have one or more associated controllers to control and monitor the operation of the components. The controllers may communicate via a serial bus (e.g., a controller area network (CAN)) or via discrete conductors.

The battery cells of the traction battery 24, such as a prismatic or pouch-type cell, may include electrochemical elements that convert stored chemical energy to electrical energy. Prismatic cells or pouch-type cells may include a housing, a positive electrode (cathode) and a negative electrode (anode). An electrolyte may allow ions to move between the anode and cathode during a discharge operation, and then return during a recharge operation. Terminals may allow current to flow out of the battery cells for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another.

Figure 2:
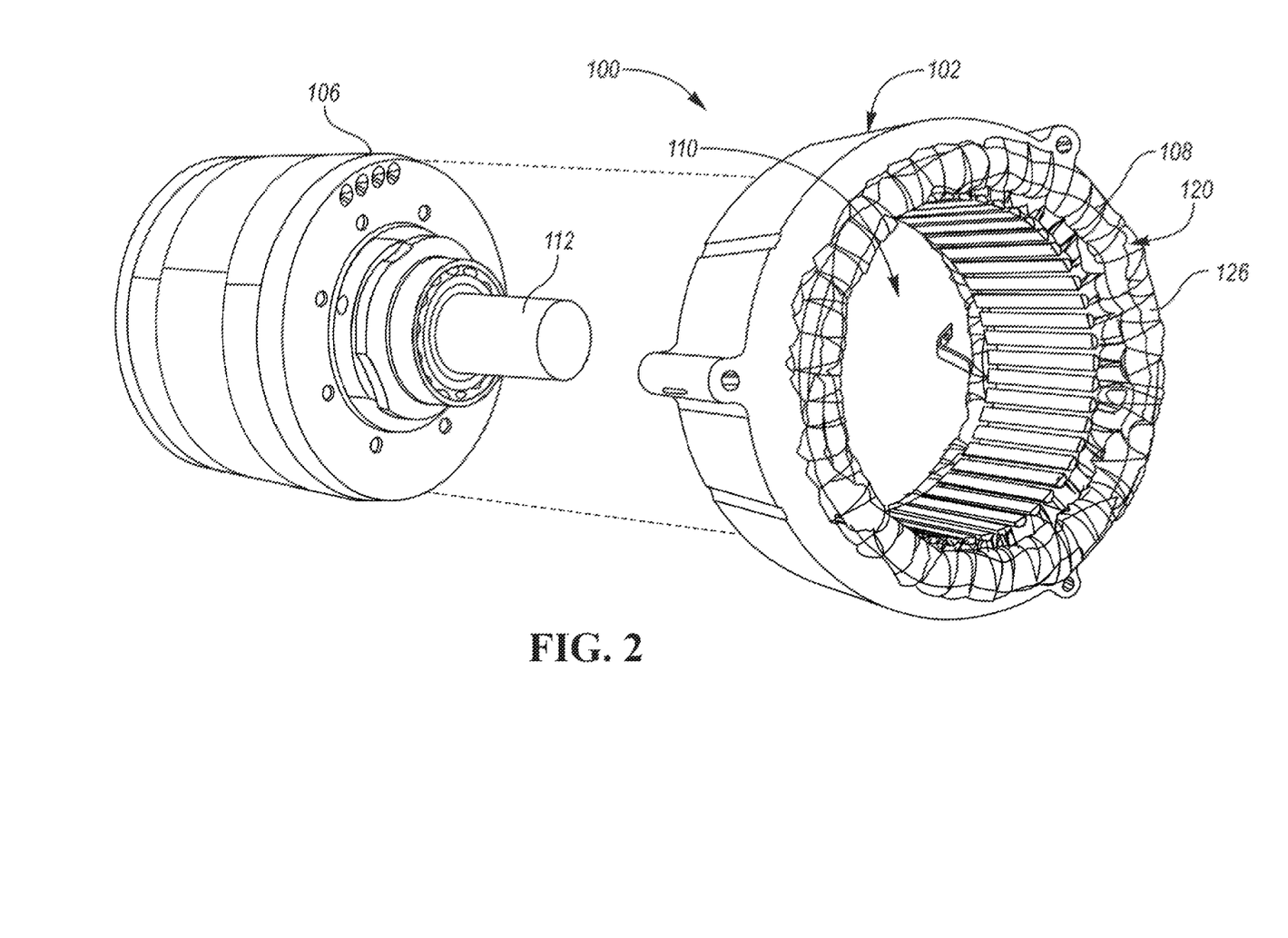
FIG. 2 is a perspective, exploded view of an example of a portion of an electric machine.

FIG. 2 is a partially exploded view illustrating an example of portions of an electric machine for an electrified vehicle, referred to generally as an electric machine 100. The electric machine may include a stator core 102 and a rotor 106. As mentioned above, electrified vehicles may include two electric machines. One of the electric machines may function primarily as a motor and the other may function primarily as a generator. The motor may operate to convert electricity to mechanical power and the generator may operate to convert mechanical power to electricity. The stator core 102 may define an inner surface 108 and a cavity 110. The rotor 106 may be sized for disposal and operation within the cavity 110. The rotor 10 may include a stack of laminations, as discussed in greater detail elsewhere herein. A shaft 112 may be operably connected to the rotor 106 and be coupled to other vehicle components to transfer mechanical power therefrom.

Windings 120 may be disposed within the cavity 110 of the stator core 102. In an electric machine motor example, current may be fed to the windings 120 to obtain a rotational force on the rotor 106. In an electric machine generator example, current generated in the windings 120 by a rotation of the rotor 106 may be used to power vehicle components. Portions of the windings 120, such as end windings 126, may protrude from the cavity 110. During operation of the electric machine 100, heat may be generated along the windings 120 and end windings 126. The rotor 106 may include magnets such that rotation of the rotor 106 in cooperation with an electric current running through the end windings 126 generates one or more magnetic fields. For example, electric current running through the end windings 126 may generate a rotating magnetic field. Magnets of the rotor 106 may magnetize and rotate with rotating magnetic field to rotate the shaft 112 for mechanical power.

Figure 3:
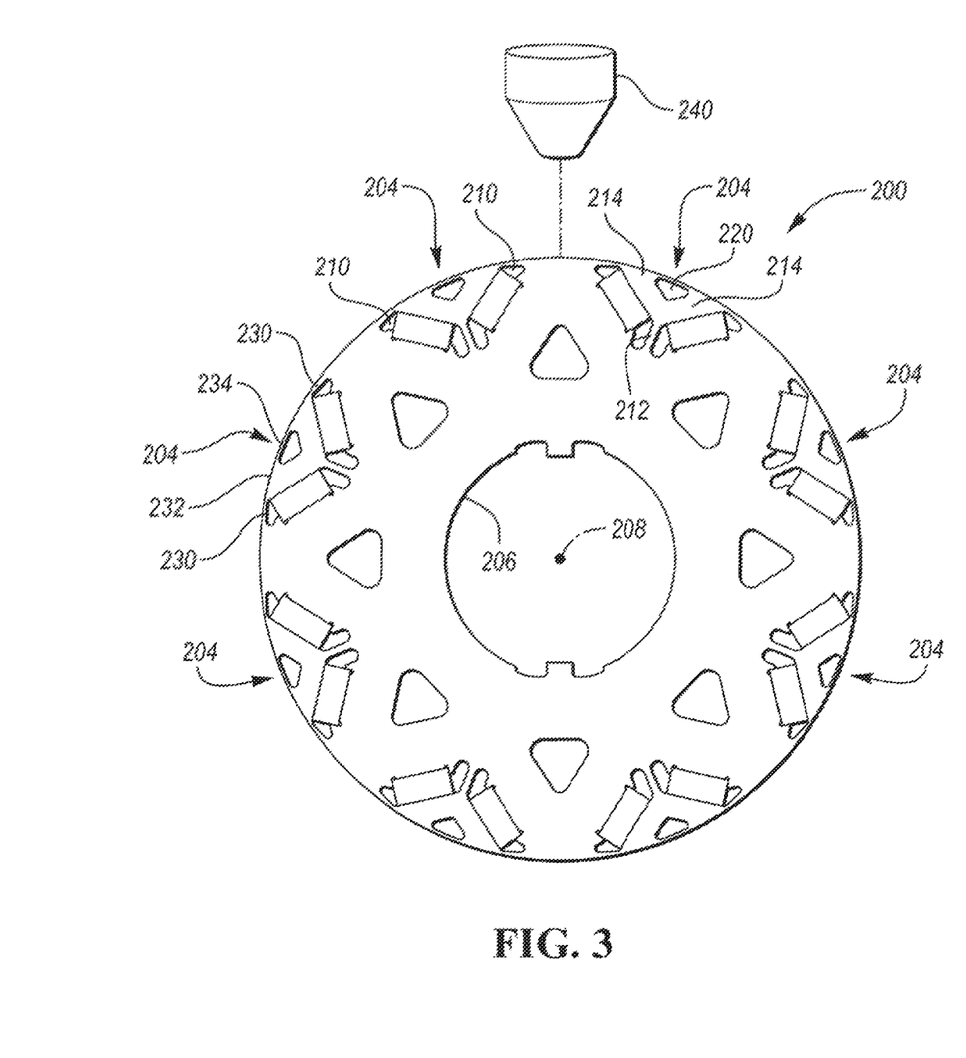
FIG. 3 is a top view of a rotor.
Figure 4:
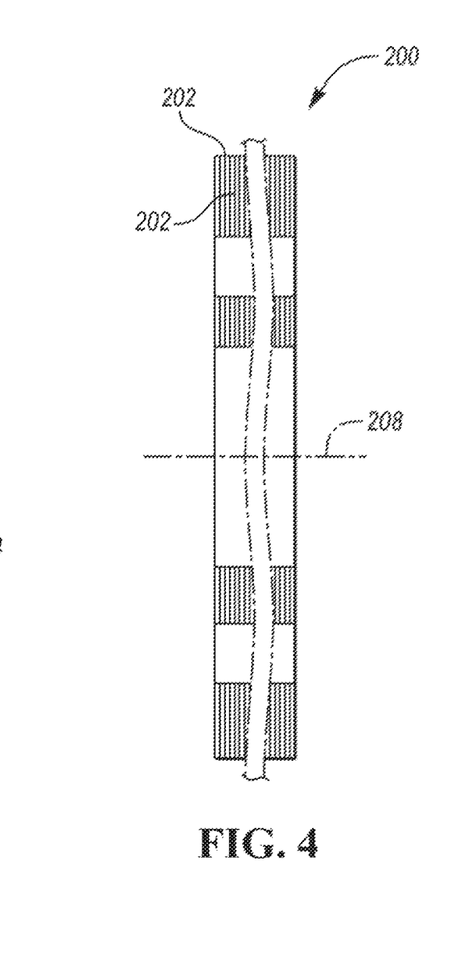
FIG. 4 is a side view of the rotor of FIG. 3 showing stacked rotor laminations.

Referring to FIGS. 3 and 4, a rotor 200 may be formed of a plurality of laminations or lamination layers 202. The rotor 200 may include a plurality of pairs of permanent magnets 204 generating magnetic poles spaced around a perimeter of the rotor. A center opening or hole 206 is provided on an inner diameter, surface, or edge of the rotor to engage an output shaft. The hole 206 extends about an axis of rotation 208.

A number of bridges connect the material surrounding permanent magnet pockets 210. A center bridge 212 extends radially between the pockets 210. Top side bridges 214 extend circumferentially outside of the pockets 210. The combination of each center bridge with the pair of outer top side bridges holds the part of the lamination beyond the bridges and the magnets 204 under centrifugal load. Mechanically, the bridges allow the rotor to reliably withstand centrifugal loads caused by the rotor being electromagnetically driven during operation of the electric machine. However, the bridges also lead to magnetic flux leakage, which reduces the output torque and efficiency of the electric machine. Thus, thin bridges are electromagnetically desirable to enable high torque output and motor efficiency. The balance between strength and performance leads to a fundamental trade-off between mechanical and electromagnetic design.

Additionally, the V-shaped orientation of the pockets 210 holding permanent magnet pairs 204 define a solid mass nested in the center of the V portion. Peripheral cavities 220, or holes, are provided in a center portion of the solid mass. The peripheral cavities 220 are adjacent to an outer surface of the rotor 200 and create thin material portions at the outer top side bridge 214 between the permanent magnets 204. Larger cavities 220 may reduce more of the mass of the rotor lamination which needs to be held by the bridges.

The lamination 200 may define, or may include, perimeter bridges 230, 234. For example, one or more perimeter bridges 230 may be provided that may extend between pockets 210 and the outer perimeter 232 of the lamination 200. One or more perimeter bridges 234 may extend between peripheral cavities 220 and the outer perimeter 232 of the lamination 200.

A lamination may be uniform (or substantially uniform) in composition. For example, a uniform Iron-Silicon (FeSi) alloy may be processed through hot rolling, annealing, and cold rolling into a thin electrical steel sheet with homogeneous chemical composition and physical properties. Rotor and/or stator lamination cores may be formed from the electrical steel sheet by die punching and subsequently stacking the punched laminations together. Punching rotor and/or stator laminations from an electrical steel sheet that has homogeneous properties may result in identical property characteristics within the rotor or stator lamination. However, an electric machine may have conflicting property requirements for different regions within a lamination. For example, in the bridge areas of a rotor (e.g., center bridge 212 and/or perimeter bridges 230 of FIG. 3), it may be desirable to reduce the magnetic permeability of a lamination in order to reduce flux leakage and increase torque density. In contrast, for the other regions within the rotor lamination, high permeability is desired to assure a large magnetic induction for high torque density. Therefore, it may be desirable to suppress the permeability only in selected regions of the rotor lamination.

In at least one approach, the lamination 200 may be provided with various compositions. The various compositions may be achieved, for example, by forming the lamination 200 through a fabrication process such as an additive manufacturing process (which may also be referred to as three-dimensional printing). In an additive manufacturing process, an object is built up, layer by layer, via selective deposition of material. Two examples of additive manufacturing using metals include Direct Metal Laser Sintering (DMLS) and Laser Deposition (LD). Each process utilizes the consolidation of powder with a laser heating source. As such, a laser head 240 may be provided to direct a laser.

To make a lamination core with the DMLS process, a computer-controlled laser is rastered across a pre-laid bed of metal powder, consolidating only the powder that was subjected to the laser heating. After a layer has been consolidated, a thin electrical insulation layer may be applied to the surface of the layer. An inorganic ceramic coating (e.g., having a high-temperature rating) may be chosen as the insulation layer. In this way, the insulation layer may endure high-temperature laser heating during subsequent metal layer depositions. A new layer of powder may then be brushed over the work piece and the consolidation step may be repeated. Once the lamination core is completed, it may be removed from the loose powder and may subsequently be heat-treated or finish-machined to remove the rough outer surface layer.

To make a lamination core with the LD process, metal powder may be introduced directly into a laser beam as a build head rasters over the work piece. The laser may create a liquid melt pool as it rasters, which may allow for a dense component to be built up, layer-by-layer, at selected positions. In between the adjacent layer depositions, the inorganic high-temperature-resistant ceramic coating may be applied to provide electrical insulation between the layers.

Forming a lamination core through additive manufacturing may allow for the use of custom compositions, for example, by introducing different elemental or alloy powders during the fabrication process at different spatial locations. This allows for strategically modifying physical properties of lamination cores within the 2D lamination plane. In this way, and as described in the various examples to follow, a rotor lamination may have locally-tuned properties. The locally-tuned properties may include, for example, magnetic permeability, mechanical strength, loss and magnetic flux density.

In at least one approach, a method of forming a rotor lamination includes fabricating, with a laser, a first region of a lamination layer with a first powdered metal. The first powdered metal may have a first composition. The first composition may be, for example, an iron-silicon (FeSi) alloy. The FeSi alloy may have approximately 0.1% to approximately 4.5% silicon by weight. The first region may at least partially define a magnet pocket. The method may further include, with a laser, fabricating a second region of the lamination layer with a second powdered metal. The second powdered metal may have a second composition that is different than the first composition. In at least one approach, the second powdered metal may have a lower magnetic permeability than the first powdered metal. For example, the second powdered metal may be a non-ferromagnetic austenite stainless steel.

As such, the second region discussed herein may have a higher flux density than the first region. The second region may have lower core loss than the first region. The second region may have higher mechanical strength than the first region.

The first and second regions may be formed in a common lamination plane. The second region may be disposed adjacent (e.g., immediately adjacent) to the first region. In this way, the second region may abut the first region.

In at least one approach, permeability of local regions may be adjusted by changing the atmosphere during layer deposition. As such, the method may further include, prior to fabricating the first region, providing an inert gas atmosphere proximate the laser. The inert gas atmosphere may be, or may include, argon. The method may further include, prior to fabricating the second region, providing reactive gas atmosphere proximate the laser. The reactive gas atmosphere may be, or may include, oxygen.

Figure 5:
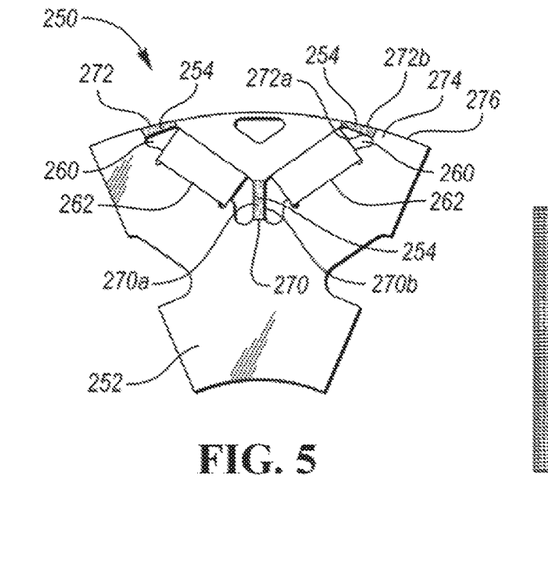
FIG. 5 is a rotor portion having a first arrangement of first and second regions.

Referring to FIG. 5, a portion of a rotor lamination 250 is shown. The rotor lamination 250 may include a first region 252 and one or more second regions 254. As discussed, the first region 252 may be formed of a first material, and the second region 254 may be formed of a second material different than the first material. The first region 252 may be formed of an FeSi alloy. In this way, the first region 252 may have a high permeability.

The first region 252 may define pockets 260 (e.g., two adjacent pockets 260) for retaining permanent magnets 262, which generate a magnetic pole of the rotor. The pockets 260 may have a V-shape to form legs. The pockets 260 may have any shape. For example, the pockets may be V-shaped, U-shaped, or linearly shaped. The legs may extend from a vertex of the V-shape, a respective common point on the U-shape (e.g., the bite), or comprise halves of the linear shape. The legs may be defined by an edge of the magnet 262, pockets 260, or a center line of the magnet 262.

To suppress magnetic permeability in certain spatial locations, the rotor lamination 250 may be provided with a custom composition arrangement. In this way, one or more second regions 254 may be provided. The material of the second region 254 may be, for example, non-ferromagnetic austenite stainless steel, which may have a high chromium content. In at least one approach, 304L stainless steel (such as Fe68Cr20Ni10Mn1Si0.3 in wt. %) or 316L may be provided in the second region 254.

The second region 254 may include a central bridge 270 that may extend between the pockets 260. In at least one approach, a first side 270a of the central bridge 270 forms a wall of a magnet pocket 260, and a second side 270b of the central bridge 270 opposite the first side 270a may form a wall of an adjacent magnet pocket 260.

The second region 254 may also include a peripheral bridge 272. The peripheral bridge 272 may extend between a magnet pocket 260 and an outer periphery 274 of the rotor lamination. In at least one approach, a first side 272a of the peripheral bridge 270 may form a wall of a magnet pocket 260, and a second side 272b of the peripheral bridge 270 opposite the first side 272a may form an outermost circumferential wall 276 of the rotor lamination 250.

As a LD process usually contains several nozzles, different elemental or alloy powders can be drawn from hoppers to the nozzles and introduced into the laser. Compositions can be changed strategically when the build head rasters at different locations of the deposition layer. For example, when moving to the bridge areas of the rotor lamination, the powder can be changed from FeSi to FeCrNiMnSi (e.g., 304L stainless steel).

In addition to elemental chromium, manganese, and nickel, other elements such as aluminum, silicon, carbon, sulfur, and/or germanium can also be introduced into the regions in which lower permeability is desired.

In the approach shown in FIG. 5, the additive manufacturing process may allow for net-shape part creation.

Figure 6:
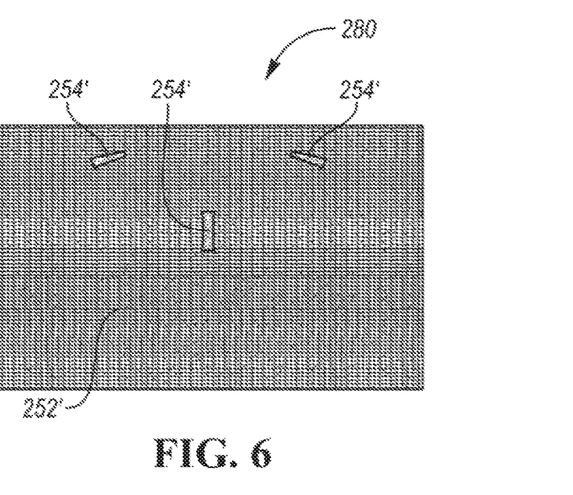
FIG. 6 is powder bed for a rotor portion that has the first arrangement of first and second regions.

Referring to FIG. 6, during a DMLS process, the chemical composition of a laid metal powder bed 280 may vary according to the relative position on the lamination plane. The laid powder bed 280 may include a first region 252' and one or more second regions 254'. To facilitate the consolidation of the powder, operating parameters (e.g., the power of the laser, laser travel speed, laser spot size, and working height etc.) may also be varied when consolidating different regions with different powder compositions (the first and second regions 252, 254).

Figures 7, 8:
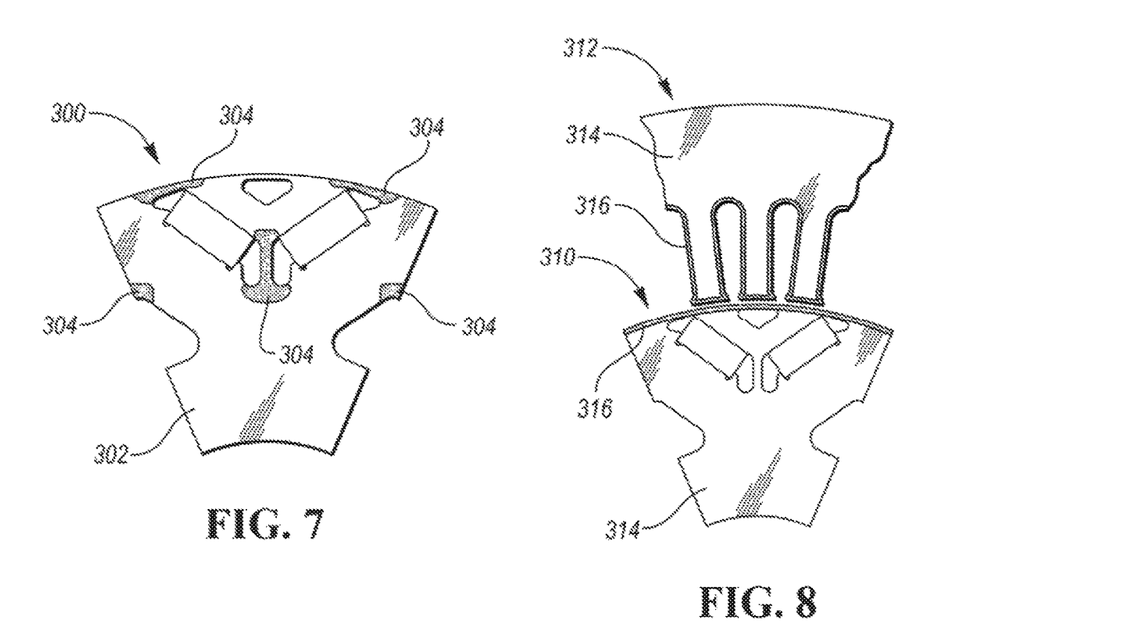
FIG. 7 is a rotor portion having a second arrangement of first and second regions.
FIG. 8 is a rotor portion and a stator portion having a third arrangement of first and second regions.

Referring to FIG. 7, a portion of a rotor lamination 300 is shown. The rotor lamination 300 may include a first region 302 and one or more second regions 304. As discussed, the first region 302 may be formed of a first material, and the second region 304 may be formed of a second material different than the first material. The first region 302 may be formed of an FeSi alloy. In this way, the first region 302 may have a normal mechanical strength. The second region 304 may have a composition that includes higher concentrations (relative to the first region 302) of one or more of aluminum, silicon, sulfur, and germanium. Such elements may create structure defects in the rotor lamination 300, which may impede dislocation motion and therefore may improve mechanical strength.

In at least one approach, the center and perimeter bridge areas of the rotor lamination 300 are both nonmagnetic and have high mechanical strength. As such, non-ferromagnetic and ultrahigh strength metal alloys such as Ti alloys and high strength steel can be deployed in the second regions 304.

Mechanical strength in the second regions 304 may also be improved through grain boundary strengthening. For polycrystalline metals such as FeSi laminations, grain size may influence the mechanical properties. For example, mechanical strength may increase with decreasing grain size. In this way, the metal deposition parameters such as the rate of powder feed, laser power, laser travel speed, laser tilt angle, working height, laser spot size may be adjusted locally to reduce lamination grain size and improve its mechanical strength. Such parameters may be adjusted while keeping the chemical composition unchanged within the lamination plane.

Referring to FIG. 8, a portion of a rotor lamination 310 and a portion of a stator lamination 312 are shown. The rotor and stator laminations 310, 312 may include a first region 314 and one or more second regions 316. As discussed, the first region 314 may be formed of a first material, and the second region 316 may be formed of a second material different than the first material. The first region 314 may be formed of an FeSi alloy. In this way, the first region 314 may have a normal core loss.

The second regions 316 may be disposed in regions that experience increased core loss; for example, at the outer rim of the rotor and at the teeth edges of the stator. In this way, the second region may extend about an entire outer circumference of the rotor lamination layer 310. In the second regions 316, the composition of the powder used during manufacturing processes (such as DMLS or LD processes) can be varied by adding higher concentrations of elemental aluminum, silicon, or alloys thereof with iron. For example, whereas the first region 314 may be an FeSi composition with approximately (e.g., +/−0.5%) 3% silicon by weight, the second regions 316 may be an FeSi composition with approximately (e.g., +/−0.5%) 6.5% silicon by weight. As such, the second regions 316 may have higher resistance and may lead to local loss reduction.

Figure 9:
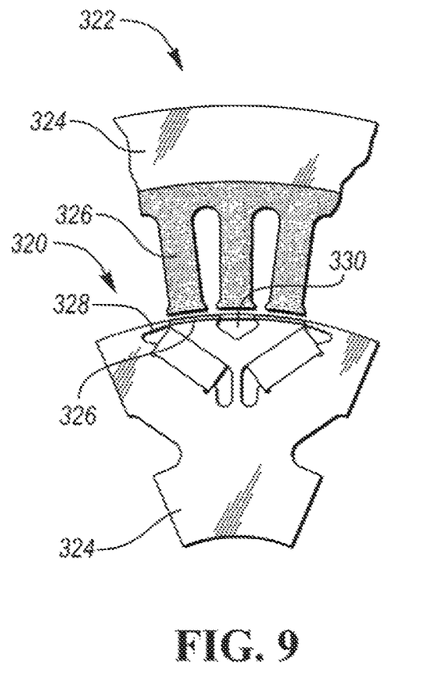
FIG. 9 is a rotor portion and a stator portion having a fourth arrangement of first and second regions.

Referring to FIG. 9, a portion of a rotor lamination 320 and a portion of a stator lamination 322 are shown. The rotor and stator laminations 320, 322 may include a first region 324 and one or more second regions 326. As discussed, the first region 324 may be formed of a first material, and the second region 326 may be formed of a second material different than the first material. The first region 324 may be formed of an FeSi alloy. In this way, the first region 324 may have a normal magnetization. The second area 326 may be provided with a higher percentage of cobalt or cobalt alloys as compared to the first region 324. In this way, the second region 326 may have a higher magnetization than the FeSi electrical steel of the first region 324.

The second regions 326 may be disposed in regions that requires increased magnetic flux density; for example, at portions of the outer rim of the rotor and at the teeth of the stator. In at least one approach, a second region 326 of the rotor lamination 320 extends along an outer circumference of the lamination layer from a perimeter of a magnet pocket 328 to a perimeter of a cavity 330 located proximate the outer circumference of the lamination layer.

Figure 10:
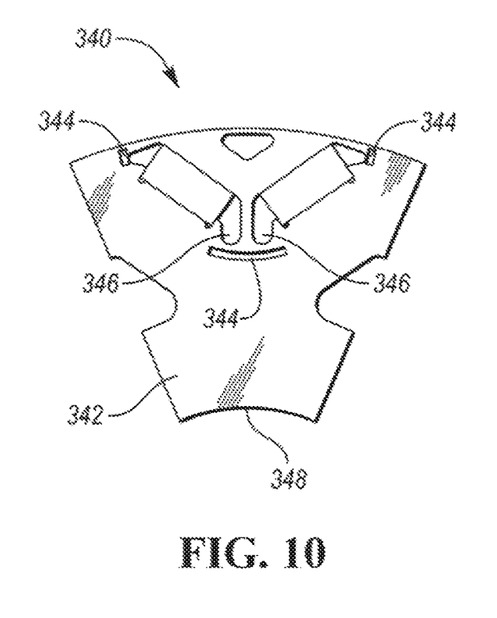
FIG. 10 is a rotor portion having an arrangement of air pockets.

Referring to FIG. 10, a portion of a rotor lamination 340 is shown. The rotor lamination 340 may include a first metal alloy 342 defining a first region, and may include a second metal alloy defining one or more second regions disposed in any location or combination locations previously discussed. For example, the second metal alloy may form at least a portion of a bridge that extends between the magnet pockets, as shown and discussed with respect to FIGS. 5-7. The first metal alloy 342 may define one or more air pockets 344. For example, the first metal alloy 342 may define an air pocket 344 that may be disposed radially between at least portions of two adjacent magnet pockets 346 and a radially-inboard surface 348 of the lamination layer 340.

As such, in at least one approach, a method of forming a rotor lamination is provided. The method may include, with a laser, fabricating a first region of a rotor lamination layer with a first powdered metal having a first composition. The method may further include, with a laser, fabricating a second region of the rotor lamination layer in contact with the first region with a second powdered metal having a second composition different than the first composition. The first and second regions may be fabricated in a common lamination plane. The method may further include forming a plurality of magnet pockets proximate an outer periphery of the rotor lamination layer. The first region may at least partially define the magnet pockets. The second region may include a central bridge that extends between the magnet pockets. The central bridge may form a wall of at least one of the magnet pockets.

The second region may also, or may instead, include a peripheral bridge. The peripheral bridge may extend between at least one of the magnet pockets and an outer periphery of the rotor lamination. A first side of the peripheral bridge may form a wall of at least one of the magnet pockets. A second side of the peripheral bridge opposite the first side may form an outermost circumferential wall of the rotor lamination.

In at least one approach, the first powdered metal may have a higher magnetic permeability than the second powdered metal. The first powdered metal may have a higher core loss than the second powdered metal. The second powdered metal may have a higher flux density than the first powdered metal. In one example approach, the first powdered metal may be an iron-silicon alloy having approximately 0.1% to approximately 4.5% silicon by weight. The second powdered metal may be a non-ferromagnetic material.

The method may further include forming, while fabricating the first region, a pocket devoid of powdered metal. The pocket may be disposed radially between at least a portion of a magnet pocket and a radially-inboard surface of the lamination layer.

In at least one approach, the method may further include, prior to fabricating the first region, providing an inert gas atmosphere proximate the laser beam and a powder bed. The method may further include, prior to fabricating the second region, providing a reactive gas atmosphere proximate the laser beam and the powder bed.

As such, a rotor may be provided with a rotor core lamination. The rotor core lamination may include a first metal alloy that at least partially defines adjacent magnet pockets proximate an outer periphery of the rotor core lamination. The rotor core lamination may further include a second metal alloy different than the first metal alloy that forms at least a portion of a bridge that extends between the magnet pockets. The first metal alloy may have a higher magnetic permeability than the second metal alloy. The second metal alloy may have a smaller grain size than the first metal alloy. The second metal alloy may define peripheral bridges that extend between the magnet pockets and the outer periphery of the rotor core lamination. The second metal alloy may extend about an entire outer circumference of the rotor core lamination. The first metal alloy may define an air pocket disposed radially between an inboard region of the rotor core lamination and the magnet pockets. The rotor core lamination may further include permanent magnets disposed in the magnet pockets at opposing sides of the second metal alloy.

Figure 11:
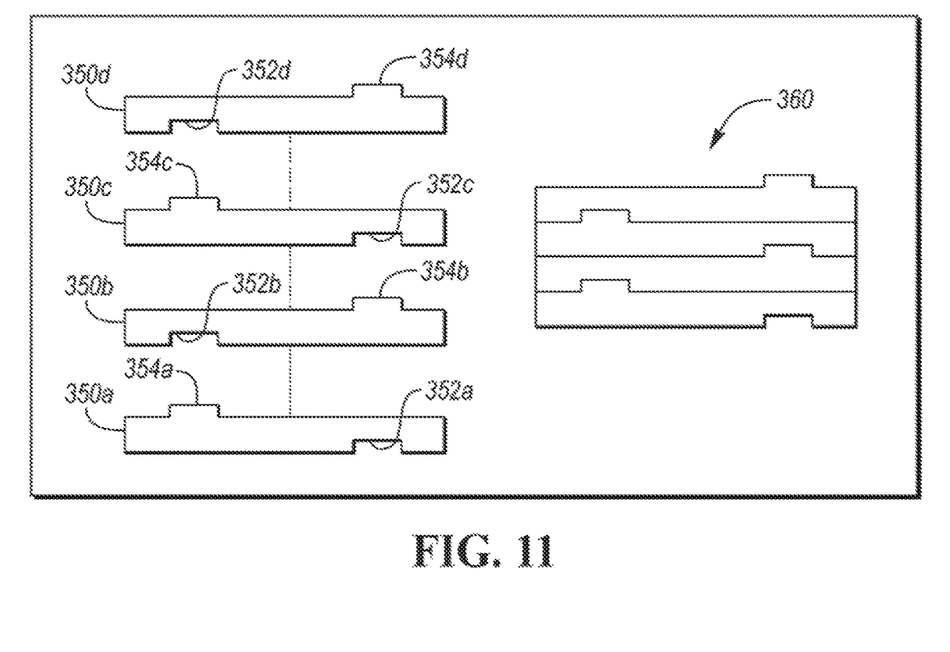
FIG. 11 is stack of rotor laminations having an arrangement of cooperating wedges and notches.

Referring now to FIG. 11, a method of forming a rotor core may include fabricating a plurality of laminations 350, which may include a first lamination 350a, a second lamination 350b, a third lamination 350c, and a fourth lamination 350d. The laminations 350 may include a combination of mortises 352 and tenons 354. For example, the first lamination 350a may have a first tenon 354a, the second lamination 350b may have a first mortise 352b and a second tenon 354b, and the third lamination 350c may have a second mortise 352c. The method may include affixing the first lamination 350a to the second lamination 350b such that the first tenon 354a is disposed within the first mortise 352b. The method may further include affixing the second lamination 350b to the third lamination 350c such that the second tenon 354b is disposed within the second mortise 352c.

As used herein, a mortise may be referred to as a notch, recess, indentation, etc. As used herein a tenon may be referred to as a wedge, protrusion, etc. The tenons may be integrally formed with the laminations (e.g., formed from the same material). As such, the laminations, at the areas of the mortises and tenons, may be integrally-formed, one-piece, unitary laminations.

In at least one approach, the first tenon 354a may have a height that corresponds to (e.g., is the same as or is just less than) a depth of the first mortise 352b. Similarly, the second tenon 354b may have a height that corresponds to (e.g., is the same as or is just less than) a depth of the second mortise 352c.

In this way, the tenons 354 may be used as interlocks to fix adjacent laminations into a solid core 360. Such three-dimensional lamination layers may have increased stiffness as compared with flat sheets. Furthermore, such three-dimensional lamination layers may provide improved core NVH performance.

As such, an electric machine may be provided. The electric machine may include a stack of interlocked rotor core laminations. Individual rotor core laminations of the interlocked rotor core laminations may include a mortise extending therein and an integrally-formed tenon extending therefrom. The tenons may interface with the mortises to interlock adjacent rotor core laminations.

In at least one approach, a first individual rotor core lamination may have a first mortise having a depth extending into the first individual rotor core lamination. A second individual rotor core lamination may have a first integrally-formed tenon having a height extending therefrom. The height of the first integrally-formed tenon may correspond to the depth of the first mortise.

The additive manufacturing of rotor and/or stator laminations contemplated herein is flexible. For example, instead of making an entire core layer-by-layer using an additive manufacturing method, only a single layer, or multiple layers but not all layers, may be formed through additive manufacturing. Furthermore, the local physical properties of the single rotor or stator lamination can be fine-tuned during the additive manufacturing process, as discussed herein. Lamination layers may be coated with an insulation layer and may be stacked together to build rotor and stator cores.

Furthermore, it is expressly contemplated that the arrangement of the second regions described with respect to FIGS. 5-9 may be combined, rearranged, or otherwise altered.

During the core building process, the bonding between different layers of additive manufacturing-formed laminations can be achieved by applying a thin layer of adhesive after the insulation layer is applied. The adhesive bonding may then be cured at either room temperature or high temperature.

The above described methods are directed toward reducing core loss in an electric machine. For some applications, the electrical device core may be processed to reduce magnetic permeability of the device. Plastic deformation changes the magnetic properties of the electrical device. For example, magnetic permeability decreases in the presence of plastic deformation of the lamination. In particular, plastic deformation may be introduced by deforming the laminations in predetermined locations to decrease magnetic permeability in selected areas of the laminations.

As above, the laminations may be formed from sheets of electrical steel. The electrical steel sheets may be of a predetermined thickness. The electrical steel sheets may be punched to create rotor laminations and stator laminations. The laminations may be derived from one or more of the electrical steel sheets. Certain areas of the laminations that are configured to serve as flux barriers may be processed to suppress magnetic permeability. To reduce the magnetic permeability of a certain area, plastic deformation is introduced at these areas. The plastic deformation may be introduced by deforming processes.

For example, a bridge region of a rotor lamination may be deformed to reduce magnetic permeability. The bridge region may be defined as the surface area between the magnet openings that make up a V-shaped pair. As described earlier, the bridge region is that region of electrical steel at the base of the V-shape at which point the magnet openings associated with a pair are at a closest distance. In addition, outer bridge regions may be defined as the surface of the lamination that lies between the distal ends of the magnet openings and the outer perimeter surface. There may be two outer bridge regions for each V-shaped pair of magnet openings.

To achieve a reduction in magnetic permeability, predefined regions may be deformed by the methods to be described. The predefined regions may be determined by analysis of the desired electrical device properties. For example, for a rotor lamination, the predefined regions may include the bridge region and the outer bridge regions. The bridge region and the outer bridge regions may be locally treated by various methods, such as peening methods (e.g., including shot peening and laser peening). A mask may be created and placed over the lamination to expose only the bridge region and/or the outer bridge regions for deforming. Such processing only changes the properties of the material in the exposed region. Note that other predefined regions may be selected based on the desired properties for a given electrical device. The predefined regions may be those surface areas of the lamination at which deformation results in a decrease in magnetic permeability of the electrical core.

Another method of deforming the laminations may be to press the predetermined regions to form one or more indentations or compressed regions in the predetermined regions (e.g., bridge region and outer bridge regions). Plastic deformation may be introduced by a punching process. The punching process may apply a shearing force that creates plastic deformation at the cut edge. Additional plastic deformation can be achieved during the punching process.

Electrical steel is commonly used in rotating electric machines, such as motors, generators and the like. During operation, centrifugal force due to rotation may stress rotor laminations. The stress of the laminations may affect the structural integrity of rotor core assembly via fatigue.

Referring now to FIGS. 12-19, an electric machine lamination may be formed using a combination of a punching process and additive manufacturing process. A punching process may utilize punch tooling which may include a punch 400 (which may also be referred to as a punch head). The punch tooling may also include a die 404. The punch tooling may also include a blankholder and/or a dieholder.

Figures 12, 13:
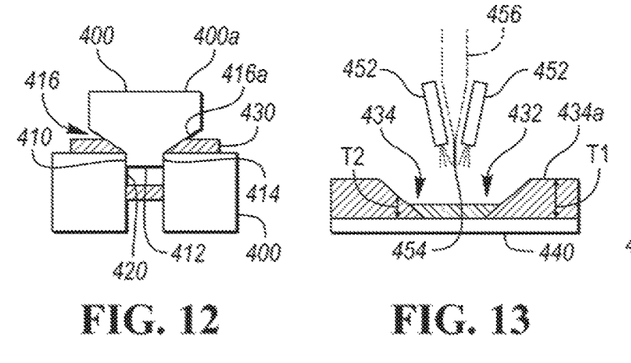
FIG. 12 depicts a first punch and die for creating an opening in a lamination when the punch is deployed.
FIG. 13 depicts an additive manufacturing operation for a first lamination.

In at least one approach, the punch 400 may include a leading portion, which may be referred to as a central region 410. The central region may include a distal surface 412 and a peripheral surface 414 (which may correspond to a peripheral wall) that extends from the distal surface. The peripheral surface 414 may, for example, extend in a plane generally orthogonal to the distal surface 412. In at least one approach, the peripheral surface 414 is a plurality of surfaces that together combine the peripheral surface. In still another approach, the peripheral surface 414 is a continuous peripheral surface.

The central region 410 of the punch 400 may have a cross-section that may correspond to an area to be punched in a sheet. For example, the central region 410 may be generally cylindrical such that the peripheral surface 414 may define a generally circular cross-section. The central region 410 may be aligned with an aperture 420 or cavity formed in the die 404. In this way, upon punching, at least a portion of the punched material may be expelled through the aperture 420.

The punch 400 may include a compression surface 416. The compression surface 416 may extend from the central region 410; for example, from the peripheral surface 414. In at least one approach, shown in FIG. 12, the punch 400*a* may have a compression surface that may be a tapered punch surface 416*a*. The tapered punch surface 416*a* may extend from the peripheral surface 414 at an oblique angle relative to the plan of the peripheral surface 414. The oblique angle may be, for example, in the range of approximately 30 degrees to approximately 60 degrees, and more particularly, in the range of approximately 35 degrees to approximately 55 degrees, and may be, for example, approximately 45 degrees.

Figure 15:
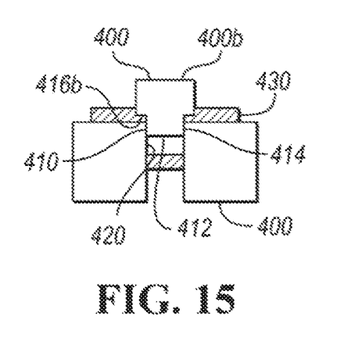
FIG. 15 depicts a second punch and die for creating an opening in a lamination when the punch is deployed.

In still another approach, shown in FIG. 15, the punch 400*b* may have a compression surface that may be a stepped punch surface 416*b*. The stepped punch surface 416*b* may extend from the peripheral surface 414 in a plane that may be generally orthogonal to the peripheral surface 414.

In at least one approach, a method of forming an electric machine lamination may include disposing a sheet 430 on the die 404. When disposed on the die 404, at least a portion of the sheet 430 may extend over the aperture 420. The sheet 430 may have a first composition that may be, for example, an iron alloy.

The method may include punching the sheet 430. Punching the sheet 430 may form an aperture or cavity in the sheet 430. In at least one approach, the punching includes punching through an entire thickness of the sheet 430 to form an aperture in the sheet. In still another approach, the punching includes punching through less than the entire thickness of the sheet 430 to form a recess or cavity in the sheet 430.

The aperture may have a dimension (e.g., length or diameter) that corresponds to the geometry of the central region 410. In at least one approach, the punch (e.g., punch 400) may extend into the die 404 such that an interface of the peripheral surface 414 and the compression surface 416 engages the die 404. In still another approach, the punch (e.g., punch 402) may extend into the die 404 such that an interface of the peripheral surface 414 and the compression surface 416 does not engage the die 404. In this approach, less than an entire height of the peripheral surface 414 may extend into the aperture 410 of the die 404.

Figure 16:
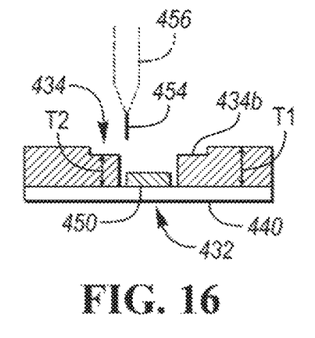
FIG. 16 depicts an additive manufacturing operation for a second lamination.

During a punching routine, the punch 400 may engage the sheet 430 and may form a compressed region 434 of the sheet 430. In this way, punching the sheet 430 may form an aperture or cavity 432 in the sheet 430, and a compressed region 434 at a perimeter of the cavity 432. As such, the compressed region 434 may have a geometry formed by (e.g., corresponding to) a geometry of the compression surface 416 of the punch 400. As shown in FIG. 13, the compressed region 434 may be a tapered compressed region 434*a* that extends about the cavity 432. As shown in FIG. 16, the compressed region 434 may be a stepped compressed region 434*b* that extends about the cavity 432. In either approach, as shown in FIGS. 13 and 16, a cross-section of the sheet 430 may a first thickness T1 adjacent the compressed region 434, and a second thickness T2 at the compressed region 434 that is greater than zero and less than the first thickness T1.

FIGS. 12 and 15 depict the punch 400 and die 404 in a position during the punching operation. The central region 410 (or leading portion) penetrates the die 404 via the opening 412 defined by the die 404. The operation of the punch 400 and die 404 causes material to be removed from the sheet 430 (or lamination) and expelled via the die opening 410. As the central region 410 penetrates the die 404 via the die opening 410, the compression surface 416 of the punch 400 further compresses the edges of the openings created in the sheet 430. The additional compression causes plastic deformation in the edges that define the opening in the sheet 430. The compression surface 416 of the punch 400 may be configured to apply an equal amount of force to the entire edge of the opening. The compression surface 416 of the punch 400 may also be configured to apply more force to predetermined edges. For example, a slope of the compression surface 416 may be varied around the punch 400 for the openings. For example, the compression surface 416 may be configured to apply a greater amount of plastic deformation to the bridge region and/or the outer bridge regions.

Referring to FIGS. 13 and 16, the sheet 430 may be disposed on a bed 440. A deposit material 450 may be deposited within the cavity 432 and on the compressed region 434. The deposit material 450 may have a second composition that is different than the first composition of the sheet 430. In at least one approach, the deposit material 450 is a powdered metal. The deposit material 450 may be deposited from a single nozzle, or from a plurality of nozzles 452 disposed proximate a beam (e.g., a laser), as shown in FIG. 13.

In at least one approach, such as in DMLS and LD additive manufacturing, a beam 454 may be scanned along the deposit material 450. The beam 454 may be an optical beam, such as a laser, that is emitted from an optical source 456. Scanning of the beam 454 along the deposit material 450 may form a bound material 470 within the cavity 432 and on the compressed region 434.

In still another approach, such as in cold spray additive manufacturing, the scanning with a beam may not be part of the forming process. In such an approach, the cold spray of deposit material may result in bound material 470 within the cavity 432 and on the compressed region 434.

In at least one approach, an electrically-insulating coating 472 may be applied to the bound material 470. In still another approach, an electrically-insulating coating 472 may be applied to the sheet 430 and to the bound material 470.

As such, in at least one approach, an electric machine lamination is provided. The electric machine may include a sheet formed of an iron alloy and at least partially defining adjacent magnet pockets. The sheet may include a tapered compressed region extending between and at an oblique angle to upper and lower surfaces of the sheet. The electric machine lamination may further include a composition different than the iron alloy disposed at the tapered compressed region, extending between the adjacent magnet pockets, and forming a center bridge having a lower magnetic permeability than the sheet.

A cross-section of the sheet may have a first thickness adjacent the tapered compressed region, and a second thickness at the tapered compressed region that is greater than zero and less than the first thickness. An upper surface of the composition may be substantially flush with the upper surface of the sheet at the tapered compressed region. A lower surface of the composition may be substantially flush with the lower surface of the sheet. The tapered compressed region and the composition at the tapered compressed region may define a combined thickness that generally corresponds to a thickness of the sheet adjacent the tapered compressed region. The tapered compressed region may include a plurality of opposing tapered compressed regions. The composition may be disposed at and may extend between the plurality of opposing tapered compressed regions. The composition disposed between the plurality of opposing tapered compressed regions may have a thickness that generally corresponds to a thickness of the sheet adjacent the tapered compressed region.

In at least one approach, an electric machine lamination is provided. The electric machine lamination may include a sheet formed of an iron alloy and at least partially defining adjacent magnet pockets. The sheet may include a reduced-thickness stepped region extending at least partially between the adjacent magnet pockets. The electric machine lamination may further include a composition different than the iron alloy disposed at the reduced-thickness stepped region, extending between the adjacent magnet pockets, and forming a center bridge having a lower magnetic permeability than the sheet.

Figure 17:
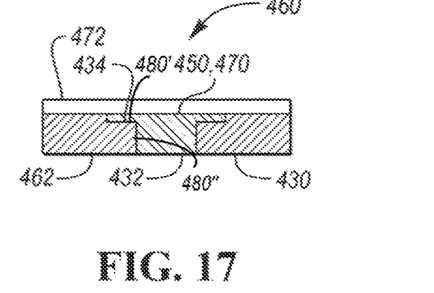
FIG. 17 depicts a second electric machine lamination formed through punching and additive manufacturing processes.

The reduced-thickness stepped region may include a first interface (e.g., interface 480' in FIG. 17) that extends in a plane substantially parallel to upper and lower surfaces of the sheet. The reduced-thickness stepped region may include a second interface (e.g., interface 480" in FIG. 17) that extends from the first interface in a plane substantially orthogonal to upper and lower surfaces of the sheet. In this way, as shown in FIG. 17, a cross-section of the electric machine lamination may define a T-shaped composition region embedded within the sheet. An upper surface of the composition may be substantially flush with an upper surface of the sheet at the reduced-thickness stepped region. A lower surface of the composition may be substantially flush with a lower surface of the sheet. The reduced-thickness stepped region and the composition at the reduced-thickness stepped region may define a combined thickness that generally corresponds to a thickness of the sheet adjacent the reduced-thickness stepped region. The composition may be a non-ferromagnetic material. The sheet and composition may at least partially define a unitary multiple-composition rotor lamination.

In this way, a single electric machine lamination may be formed. A method may include forming a plurality of electric machine lamination utilizing one or more, or combination of, the steps previously described. In this way, a second electric machine lamination may be formed by punching a second sheet having the first composition to form a cavity and a compressed region at a perimeter of the cavity. The second electric machine lamination may further be formed by depositing, within the cavity and on the compressed region, a deposit material having the second composition. The second electric machine lamination may further be formed by scanning a beam along the deposit material to form a bound material within the cavity and on the compressed region. The first and second electric machine lamination may be secured to each other to form at least a portion of an electric machine. The process may be repeated once, twice, or three or more times to form an electric machine component.

Figure 14:
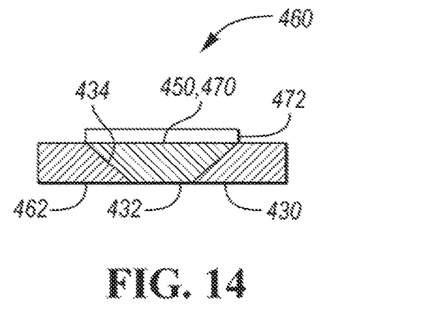
FIG. 14 depicts a first electric machine lamination formed through punching and additive manufacturing processes.

Referring to FIGS. 14 and 17, a unitary electric machine lamination 460 may be provided. The unitary electric machine lamination may include a sheet 430 that may be formed, for example, of an iron alloy. The sheet 430 may include a core region 462, and a compressed region 434 that may extend from the core region 462. The compressed region 434 may be formed by one or more punches, such as punches 400a and/or 400b. The compressed region 434 may have a thickness less than a thickness of the core region 462.

The unitary electric machine lamination 460 may further have a deposited composition 470 that may be formed of a second material different than the that of the sheet 430. The deposited composition 470 may be disposed at one or both of the cavity 432 and the compressed region 434. In at least one approach, the deposited composition 470 and compressed region 434 may define a combined thickness that generally corresponds to the thickness of the core region 462.

As such, a unitary electric machine lamination 460 contemplated herein may have an integrated or embedded deposited composition (e.g., when viewed along a cross-section of the lamination, or when viewed along a top plan view of the lamination). In this way, the unitary electric machine lamination 460 may be referred to as a heterogeneous unitary electric machine lamination. The deposited composition may have different physical properties than the lamination cores within a two-dimensional plane. The differing physical properties may include one or more of a) magnetic permeability, b) mechanical strength, c) loss, and d) magnetic flux density. As discussed, the deposited composition may be provided at one or more of the areas discussed elsewhere herein.

In at least one approach, the sheet 430 and the deposited composition 470 may at least partially define a unitary multiple-composition rotor lamination. In still another approach, the sheet 430 and deposited composition 470 may at least partially define a unitary multiple-composition stator lamination.

Although and punch-and-die assembly is discussed herein, it is expressly contemplated that a mold may be configured to form one or more indentations in an electrical steel sheet. A press machine may be configured with an upper mold and a lower mold. The upper mold may be secured to an upper press member. The lower mold may be secured to a lower press member. The upper mold and the lower mold may be configured to cooperate to form an indentation or a plurality of indentations in a lamination that is placed in between. The upper press member and the lower press member may be configured to move relative to one another. The lamination may be positioned in the mold and the upper press member and the lower press member. Pressure may be applied to the upper press member and/or the lower press member. The pressure forces the upper mold and the lower mold to move together resulting in an indentation being formed in the lamination. The size, shape, and depth of the indentations may be configured to optimize the reduction of magnetic permeability for each electric machine design. Other shaped indentations are possible. For example, the mold may have a wave-shaped cross section. The indentations may be configured to have rounded edges, square/rectangular edges, or conical shape depending on the specific characteristics desired.

The pressing operation may be performed after the lamination is punched. Further, the pressing operation may be incorporated with the punching operation. The punch and die may be configured to punch the openings of the lamination and, during the same operation, form indentations in the predetermined regions. The mold may be configured to form indentations at the predetermined locations of the lamination. For example, a predetermined pattern of indentations may be formed in the bridge region and/or the outer bridge regions. The pattern may be selected to tune the magnetic permeability of the region to a predetermined value.

In still another approach, a press machine may be configured with a first mold secured to an upper press member and a second mold secured to a lower press member. Pressing the lamination may produce plastic deformation through the whole of the predetermined regions. A lamination may be inserted between the first mold and the second mold and pressed. The resulting lamination may form a curved cross-sectional profile in those predetermined regions. The shape and curvature may be adjusted to modify the magnetic permeability in the predetermined regions.

As discussed herein, a method of forming an electric machine lamination is provided. The method may include punching a ferromagnetic sheet. The punching of the ferromagnetic sheet may form a cavity at least partially defining adjacent magnet pockets. The punching of the ferromagnetic sheet may further form a compressed region at a perimeter of the cavity. The method may further include constructing a center bridge. The center bridge may have magnetic properties different than the ferromagnetic sheet. The center bridge may extend from the compressed region between the adjacent magnet pockets. The center bridge may be constructed by depositing a non-ferromagnetic material within the cavity and on the compressed region.

Figure 18:
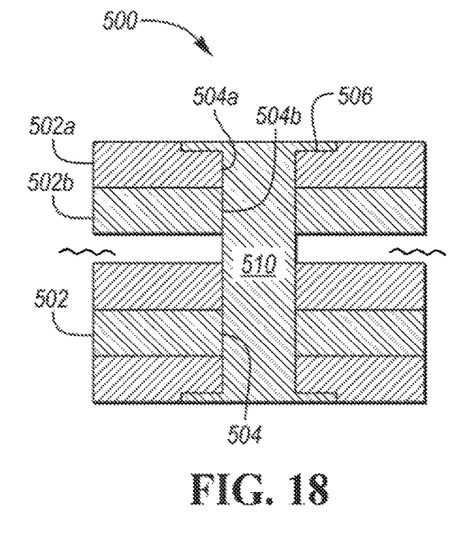
FIG. 18 depicts a first stack of electric machine laminations.
Figure 19:
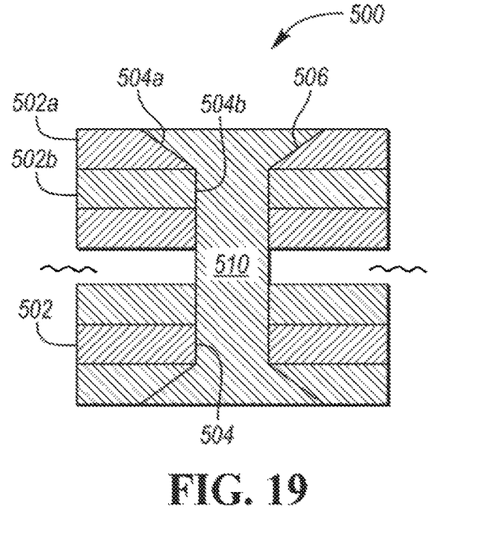
FIG. 19 depicts a second stack of electric machine laminations.

Referring now to FIGS. 18 and 19, a method of forming an electric machine component 500 may include punching a plurality of sheets 502 to form a plurality of through-apertures 504. The sheets 502 may have a first composition. The sheets 502 may be stacked to at least partially align the through-apertures 504.

A deposit material 510 may be deposited within the through-apertures 504. The deposit material 510 may have a second composition different than the first composition. As previously discussed with respect to FIGS. 13 and 16, in an optional approach, a beam may be scanned along the deposit material 510 to form a bound material within the through-apertures 504.

In at least one approach, the sheets 502 include an exterior sheet 502a having an exterior through-aperture 502a and an interior sheet 502b having an interior through-aperture 502b. The exterior sheet 502a may include a cross-sectional profile adjacent the exterior through-aperture 502a that is different than a cross-sectional profile adjacent the interior through-aperture 502b. As previously described, a punch may be utilized to punch the exterior sheet 502a to form the exterior through-aperture 504a and a compressed region 506 at a perimeter of the exterior through-aperture 504a. For example, with reference to FIG. 18, the compressed region 506 may be a tapered compressed region that extends about the exterior through-aperture 504a. With reference to FIG. 19, the compressed region 506 may be a stepped compressed region that extends about the exterior through-aperture 504a. In at least one approach, the interior sheet 502b may be substantially free of a compressed region at a perimeter of the interior through-aperture.

As such, an electric machine may be provided. The electric machine may include a lamination stack that may include exterior laminations (e.g., laminations 502a) and interior laminations (e.g., laminations 502b) disposed therebetween. The interior and exterior laminations may include inner cutouts disposed in alignment. At least a portion of the inner cutouts of the exterior laminations may have a width greater than inner cutouts of the interior laminations. The electric machine may further include a core deposit having a lower magnetic permeability than the lamination stack disposed within the inner cutouts of the interior and exterior laminations. As shown in FIG. 18, the inner cutouts of the exterior laminations may have a stepped interface extending parallel to and planarly offset from exterior surfaces of the exterior laminations. As shown in FIG. 19, the inner cutouts of the exterior laminations may have a tapered interface extending between and at an oblique angle to exterior surfaces of the exterior laminations.

The exterior laminations may include a compressed region adjacent the inner cutouts of the exterior laminations. The interior laminations may be substantially free of compressed regions adjacent the inner cutouts of the interior laminations. Exterior surfaces of the core deposit may be substantially flush with respective exterior surfaces of the exterior laminations.

In at least one approach, microscopic punching defects at the cutting edge of electrical steel may be removed by a mechanical smoothing method. In one example, the electrical steel is first punched into the finished shape, (e.g., a rotor lamination of an electric machine). Next, the laminations are stacked together to form a core, (e.g., a rotor core of an electric machine). Lastly, the assembled core is then treated by forcibly propelling a stream of abrasive material (i.e., media) against a pre-defined cutting surface of the rotor core to smooth the rough cutting surface of the microscopic defects. Aspects of the improved fatigue life include smoothing cutting defects to prevent fatigue crack initiation and inducing a compressive stress layer to prevent crack initiation and propagation.

Figure 20:
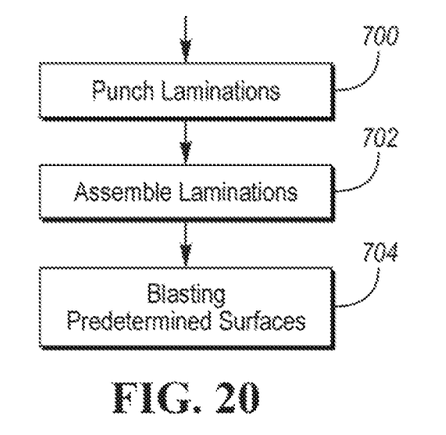
FIG. 20 depicts a sequence of operations for blasting a rotor of an electric machine.

FIG. 20 depicts an example process flow for a method of increasing fatigue life in an electrical device. At operation 700, core laminations are formed by punching a sheet of electrical steel resulting in one or more cut edges. At operation 702, the laminations may be assembled into a core such that an outer perimeter surface of the core is defined by the cut edges. At operation 704, the predetermined surfaces may be blasted by the techniques that have been previously described. For example, the predetermined surfaces may include the top bridge surfaces of the rotor, namely an arc along the outer surface of the rotor and the inner surface within the openings formed in the core (e.g., magnet openings). Also, the predetermined surfaces may include the center bridge surfaces within the openings formed in the core (e.g., magnet openings).

Figure 21:
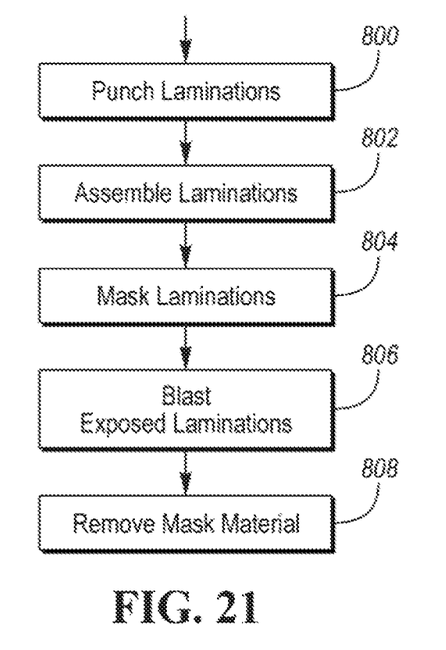
FIG. 21 depicts a sequence of operations for masking and blasting a rotor of an electric machine.

FIG. 21 depicts an example process flow for a method of increasing fatigue life in an electrical device. At operation 800, core laminations are formed by punching a sheet of electrical steel resulting in one or more cut edges. At operation 802, the laminations may be assembled into a core such that an outer perimeter surface of the core is defined by the cut edges. At operation 804, the assembled laminations are masked exposing predetermined surfaces. For example, the predetermined surfaces may include the top bridge surfaces of the rotor, namely an arc along the outer surface of the rotor and the inner surface within the openings formed in the core (e.g., magnet openings). Also, the predetermined surfaces may include the center bridge surfaces within the openings formed in the core (e.g., magnet openings). The masking may include application of a polymer, masking tape, or other thin film or metal sheet to protect areas covered while leaving other areas exposed and subject to the blasting. Alternatively, a nozzle may be able to selectively target specific areas (e.g., top bridge surfaces and center bridge surfaces). Limiting the blasting to these areas may reduce the time needed to process the laminations, thus reducing costs. At operation 806, the predetermined surfaces may be blasted by the techniques that have been previously described. For example, the predetermined surfaces may include the top bridge surfaces of the rotor, namely the arc along the outer surface of the rotor and the inner surface within the openings formed in the core (e.g., magnet openings). Also, the predetermined surfaces may include the center bridge surfaces within the openings formed in the core (e.g., magnet openings). Lastly in operation 808, the masking material may be removed from the surface via mechanically removing the tape (e.g., peeling the tape off), or a bath (plasma or wet bath) to remove the polymer. However, if the masking was done via mechanically directing the blast stream to the specific regions, then this operation would not be needed.

Although the description is applied to electric machines in a vehicle application, the methods described are applicable electrical devices used in any field of application. The methods are applicable to other rotating applications of electrical steel as well.

The methods of locally tuning physical properties of lamination cores through metal AM technologies is not limited to the DMLS and LD processes discussed herein. Other metal additive manufacturing technologies, such as direct metal laser melting, selective laser melting, electron beam additive manufacturing and laser-engineered net shaping may also be utilized. It is contemplated that the proposed method to locally tune physical properties of lamination cores may use any suitable method that includes powder bed fusion and directed energy deposition related additive manufacturing technologies.

The proposed methods may also be utilized in cold spray additive manufacturing, where fine powder is accelerated by a high-velocity compressed gas jet. This powder then hits a substrate with sufficient kinetic energy to produce a dense layer of material. By changing the powder composition, the local physical properties can be tuned during the lamination deposition process. As cold spray additive manufacturing is a relatively low temperature additive manufacturing process, additional flexibility in choosing insulation coating material used between lamination layers may be available. To form a well bonded and dense deposit in the cold spray additive manufacturing process, the materials may be plastically deformed upon impact, thereby creating residual stress and defects in the as-deposited material. Lamination cores made by cold spray additive manufacturing may be heat-treated to release the residual stress and improve the physical properties.

Furthermore, the various approaches to locally tuning properties of an electric machine component discussed herein may be combined, modified and combined, or otherwise used in conjunction with one another. As such, it is expressly contemplated that the various approaches to both punching and additive manufacturing described herein may be used in conjunction with one another.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method of forming a rotor lamination comprising:
providing an inert gas atmosphere proximate a laser and a powder bed, and then fabricating with the laser a first region of a rotor lamination layer with a first powdered metal having a first composition; and
providing a reactive gas atmosphere proximate the laser and the powder bed, and then fabricating with the laser a second region of the rotor lamination layer in contact with the first region with a second powdered metal having a second composition different than the first composition, the first and second regions being fabricated in a common lamination plane.

2. The method of claim 1 further comprising:
forming a plurality of magnet pockets proximate an outer periphery of the rotor lamination layer, wherein the first region at least partially defines the magnet pockets.

3. The method of claim 2 wherein the second region includes a central bridge that extends between the magnet pockets.

4. The method of claim 3 wherein the central bridge forms a wall of at least one of the magnet pockets.

5. The method of claim 2 wherein the second region includes a peripheral bridge that extends between at least one of the magnet pockets and an outer periphery of the rotor lamination.

6. The method of claim 5 wherein a first side of the peripheral bridge forms a wall of at least one of the magnet pockets, and wherein a second side of the peripheral bridge opposite the first side forms an outermost circumferential wall of the rotor lamination.

7. The method of claim 1 wherein the first powdered metal has a higher magnetic permeability than the second powdered metal.

8. The method of claim 1 wherein the first powdered metal has a higher core loss than the second powdered metal.

9. The method of claim 1 wherein the second powdered metal has a higher flux density than the first powdered metal.

10. The method of claim 1 wherein the first powdered metal is an iron-silicon alloy having approximately 0.1% to approximately 4.5% silicon by weight, and wherein the second powdered metal is a non-ferromagnetic material.

11. The method of claim 1 further comprising:
   while fabricating the first region, forming a pocket devoid of powdered metal, wherein the pocket is disposed radially between at least a portion of a magnet pocket and a radially-inboard surface of the lamination layer.

* * * * *